US 6,594,711 B1

United States Patent
Anderson et al.

(12) United States Patent
(10) Patent No.: US 6,594,711 B1
(45) Date of Patent: Jul. 15, 2003

(54) METHOD AND APPARATUS FOR OPERATING ONE OR MORE CACHES IN CONJUNCTION WITH DIRECT MEMORY ACCESS CONTROLLER

(75) Inventors: Timothy D. Anderson, Dallas, TX (US); Sanjive Agarwala, Richardson, TX (US); Charles L. Fuoco, Allen, TX (US); David A. Comisky, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 452 days.

(21) Appl. No.: 09/603,057

(22) Filed: Jun. 26, 2000

Related U.S. Application Data (60) Provisional application No. 60/144,569, filed on Jul. 15, 1999, and provisional application No. 60/144,550, filed on Jul. 15, 1999.

(51) Int. Cl.[7] .............................................. G06F 13/00
(52) U.S. Cl. ................. 710/22; 710/4; 710/26; 710/38; 711/100; 711/123; 712/38
(58) Field of Search ................ 710/4, 22, 26, 710/38; 711/100, 123; 712/38

(56) References Cited

U.S. PATENT DOCUMENTS 5,651,127 A    7/1997   Gove et al.
6,185,634 B1 *  2/2001  Wilcox .......................... 710/26
6,298,366 B1 * 10/2001  Gatherer et al. ............. 708/523

FOREIGN PATENT DOCUMENTS

JP          410063574 A  *  3/1998

* cited by examiner

Primary Examiner—Jeffrey Gaffin
Assistant Examiner—Tammara Peyton
(74) Attorney, Agent, or Firm—Robert D. Marshall, Jr.; W. James Brady, III; Frederick J. Telecky, Jr.

(57) ABSTRACT

A data processing apparatus includes a data processor core having integral cache memory and local memory, and external memory interface and a direct memory access unit. The direct memory access unit is connected to a single data interchange port of the data processor core and to an internal data interchange port of the external memory interface. The direct memory access unit transports data according to commands received from the data processor core to or from devices external to the data processing unit via the external memory interface. As an extension of this invention, a single direct memory access unit may serve a multiprocessing environment including plural data processor cores. The data processor core, external memory interface and direct memory access unit are preferably embodied in a single integrated circuit. The data processor core preferably includes an instruction cache for temporarily storing program instructions and a data cache for temporarily storing data. The data processor core requests direct memory access data transfers for cache service.

9 Claims, 5 Drawing Sheets

METHOD AND APPARATUS FOR OPERATING ONE OR MORE CACHES IN CONJUNCTION WITH DIRECT MEMORY ACCESS CONTROLLER

This application claims priority under 35 USC §119(e)(1) of Provisional Application No. 60/144,569 filed Jul. 15, 1999 and Provisional Application No. 60/144,550, filed Jul. 15, 1999.

TECHNICAL FIELD OF THE INVENTION

The technical field of this invention is data processing systems and particularly data processing systems with combined external memory access and direct memory access.

BACKGROUND OF THE INVENTION

Data processing systems typically employ data caches or instruction caches to improve performance. A small amount of high speed memory is used as the cache. This cache memory is filled from main memory on an as needed basis. When the data processor requires data or an instruction, this is first sought from the cache memory. If the data or instruction sought is already stored in the cache memory, it is recalled faster than it could have been recalled from main memory. If the data or instruction sought is not stored in the cache memory, it is recalled from main memory for use and also stored in the corresponding cache. A performance improvement is achieved using cache memory based upon the principle of locality of reference. It is likely that the data or the instruction just sought by the data processor with be needed again in the near future. Use of cache memories speeds the accesses needed to service these future needs. A typical high performance data processor will include instruction cache, data cache or both on the same integrated circuit as the data processor core.

Conventional data processor cores typically include direct memory access (DMA). Direct memory access is a method of memory access not requiring data processor core activity, conventionally accomplished by a DMA functional block. This DMA functional block includes an I/O device and a controller function. This functional feature allows interface of external devices with the data processor core, internal memory, external memory, and other portions of the integrated circuit. The DMA interface is the communication link which relieves the data processor core from servicing these external devices on its own, preventing with loss of many data processor core cycles which would be consumed in a direct data processor core to external device interface.

The conventional direct memory access unit consists of a simple set of address generators which can perform reads and writes of some, or perhaps all, addresses within a data processing system. The address generation logic is normally implemented as a simple counter mechanism, with a reload capability from a set of data processor core memory-mapped registers. A typical use of a direct memory access unit is for the data processor core to load the counters with a starting address and a count, representing the amount of data to transfer. The data processor core must supply both the source and destination addresses for the transfer. Once this information has been loaded into the counters, the data processor can start the direct memory access via a memory mapped register write. The direct memory access unit then begins performing read and write accesses to move the requested data without further intervention from the data processor core. The data processor core is free to begin performing other tasks.

As the direct memory access unit performs read and writes to the source and destination locations, the addresses are incremented in each counter while the count is decremented. Once the count reaches zero, the transfer is complete and the direct memory access terminates. Most direct memory access units include a mechanism of signaling this complete state back to the data processor core via a status bit or interrupt. In general the interrupt method is preferred because it does not require a polling loop on the DSP to determine the completion status.

There are several features which are becoming increasingly common to direct memory access units which have attempted to address the issue of providing higher performance. The first is the inclusion of more DMA channels. A single DMA channel basically consists of all the hardware required to process a single direct memory access. This will generally include at least a source and destination address register/counter, a byte count register/counter, and the associated control logic to allow it to perform basic read and write operations. In a multi-channel direct memory access unit, the logic for a single channel is generally just replicated multiple times to provide increased channel capability. In addition to the multiple instantiations of the channels, a multi-channel direct memory access unit must also include some arbitration logic to provide time division access by all the channels to the memory/peripherals which the channels can address. Conventional direct memory access units may include from 2 to 16 channels. One advantage of additional channels is that each channel can contain parameters for a specific type of transfer. The data processor core sets up each channel in advance, and does not have to reload the direct memory access unit registers each time a new transfer has to be done, the way it would have to if only a single channel existed. Alternatively, a single direct memory access unit with plural channels may service plural data transfer requestors.

It is typical to provide a separate access port to the external memory interface for both the data processor core and for the direct memory access unit. The data processor core may directly request read or write data or instruction access from external memory via the external memory interface. Additionally, the data processor core makes cache service requests via the external memory interface. Cache service may also be reads or writes. The direct memory access unit may also make memory accesses, either reads or writes, under control of the data processor core via the external memory interface. This known technique requires the external memory interface to service two masters, the data processor core and the direct memory access unit.

This known technique encounters problems when extended to integrated circuits including plural data processor cores. According to this known technique, each of the plural data processor cores requires a port to the combined chip level external memory interface. In addition the external memory interface must be responsive to a combined chip level direct memory access unit. This configuration requires a lot of interconnect on the chip between the data processor cores and the external memory interface. In addition, this configuration is not easily scalable to accommodate additional data processor cores on the same integrated circuit. This is because each new data processor core requires another master port connection to the external memory interface.

SUMMARY OF THE INVENTION

This invention relates to a data processing apparatus. The data processing apparatus includes a data processor core having integral cache memory and local memory, and external memory interface and a direct memory access unit. The data processor core has a single data interchange port. The external memory interface has an internal data interchange port and an external data interchange port adapted for connection to devices external to the data processing apparatus. The direct memory access unit is connected to the single data interchange port of the data processor core and to the internal data interchange port of the external memory interface. The direct memory access unit transports data according to commands received from the data processor core to or from devices external to the data processing unit via the external memory interface. As an extension of this invention, a single direct memory access unit may serve a multiprocessing environment including plural data processor cores.

The data processor core, external memory interface and direct memory access unit are preferably embodied in a single integrated circuit. This single integrated circuit has the external interchange port of the external memory interface as its sole data port to external devices.

The data processor core preferably includes an instruction cache for temporarily storing program instructions and a data cache for temporarily storing data. The data processor core requests direct memory access data transfers for cache service such as: instruction cache fill upon a read access miss to the instruction cache; data cache fill upon a read access miss to the data cache; data writeback to system memory upon a write miss to the data cache; write data allocation to the data cache upon a write miss to the data cache; data writeback to system memory upon eviction of dirty data from the data cache.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
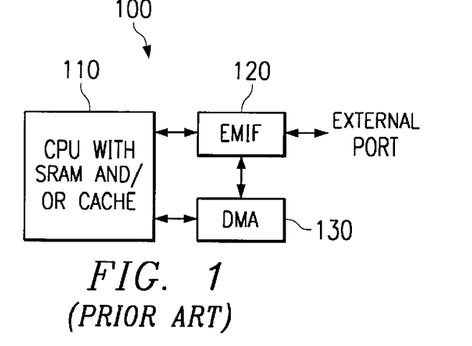
FIG. 1 illustrates a known technique for connecting a data processor core, which may include cache and local memory, a direct memory access unit and an external memory interface.

FIG. 1 is a block diagram of a data processing apparatus according to the known art. Data processing apparatus 100 includes a data processor core 110. Data processor core 110 typically includes a central processing unit (CPU) plus corresponding data cache memory (Dcache), instruction cache memory (Icache) and local memory (SRAM or DRAM). Data processing apparatus 100 also includes an external memory interface 120, which provides the connection to external devices including external system memory (not shown) via an external port. Additionally, data processing apparatus 100 includes a direct memory access unit 130. Direct memory access unit 130 operates semi-autonomously under control of data processor core 110 to transfer data between memories. This data transfer typically includes data transfer to and from external system memory. For those data transfers direct memory access unit 130 is coupled to external memory interface 120. In practice, direct memory access unit 130 handles direct memory access data transfers ordered by direct memory access requests from data processor core 110. Direct memory access unit 130 employs external memory interface 120 when the data transfer involves external memory. Data processor core 110 may make external memory accesses for read or write with external system memory via external memory interface 120. Data processor core 110 also uses external memory interface 120 for external system memory interface for cache service. An instruction read cache miss or a data read cache miss generates a data read from external system memory via external memory interface 110. If a technique known as cache write allocation is used, a data write cache miss also generates a data read from external system memory via external memory interface 110. Typically there is no instruction write cache miss because this would involve self-modifying code and this is generally prohibited. There are also several cache events that write to external system memory. If a write through protocol is used, a data write cache miss generates a data write to the external memory via external memory interface 120. A data instruction read cache miss or write cache miss may require eviction of another cache entry. If the evicted cache entry is dirty, that if it has been changed since the last write to external system memory, then this data must be written to the external system memory to preserve the program state. This write to external system memory employs external memory interface 120. Eviction of a clean cache entry, one that has not been changed, does not require a write to external system memory. A cache flush involves complete purging of the cache. Clean cache entries may be discarded upon a cache flush. Dirty cache entries must be written back to the external system memory via external memory interface 120 upon a cache flush.

This organization has several disadvantageous characteristics. External memory interface 120 must connect to both data processor core 110 and to direct memory access unit 130. Each of these devices must be able to control operation of external memory interface 120. Thus external memory interface 120 must serve two master devices and must prioritize requests from the two sources. The data routing is also disadvantageous. Bi-directional data paths for data transfers must be made between data processor core 110 and external memory interface, between data processor core 110 and direct memory access unit 130 and between external memory interface 120 and direct memory access unit 130. These data paths make for a difficult routing when these parts are embodied in a single integrated circuit. These data paths also make placement of the parts on a single integrated circuit difficult.

These disadvantages are compounded when more than one data processor core is embodied in the single integrated circuit. Numerous factors make embodying plural data processor cores on a single integrated circuit advantageous. The continual reduction in integrated circuit feature size enables more and more transistors to be placed on one integrated circuit. The reduced size of individual transistors reduces the amount of charge each transistor must transport to switch states. Thus these smaller transistors can switch at higher frequencies. These smaller transistors must operate at lower supply voltages. The oxide breakdown voltage of the smaller transistor requires the lower supply voltages. The reduction in wire size has the opposite effect. The higher resistance caused by smaller cross section wires decreases the rate a signal can transit a wire in an integrated circuit. These factors will eventually lead to a situation in which a signal cannot cross the whole integrated circuit within one clock cycle. Trying to construct more and more complex data processors under such conditions would be a losing proposition. The natural response is to embody plural simpler data processors on the integrated circuit. Each such data processor would be within one clock domain. Thus each data processor would be small enough so that data can communication within the data processor within a single clock cycle. Such integrated circuits would use parallel multi-threaded processing for problems now solved using essentially serial processing on a single data processor.

Figure 2:
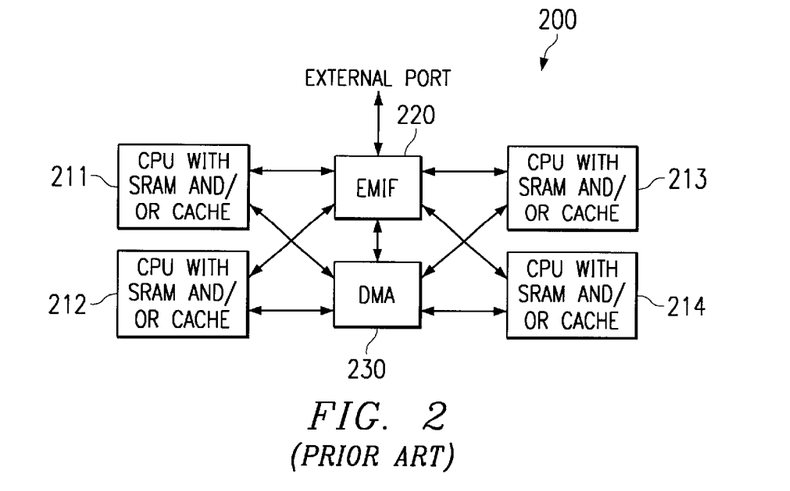
FIG. 2 illustrates a known technique for connecting plural data processor cores, each of which may include cache and local memory, a combined direct memory access unit and a combined external memory interface.

FIG. 2 illustrates the extension of the known art such as illustrated in FIG. 1 to multiprocessing. Data processing apparatus 200 includes plural data processor cores 211, 212, 213 and 214. Of course this is just an example and more or fewer data processor cores are possible. Each data processor core 211, 212, 213 and 214 is connected to external memory interface 220 for ordinary data access and cache service. Each data processor core 211, 212, 213 and 214 is also connected to direct memory access unit 230 for direct memory access data transfer. Finally, direct memory access unit 230 is also connected to external memory interface 220 for access to external system memory.

This extension of known art to multiprocessing reveals the flaws of this construction. There are many bi-directional data paths required in this technique. External memory interface 220 must respond to each of the plural data processor cores 211, 212, 213 and 214 as well as direct memory access unit 230. In a large integrated circuit the many required data paths make a very difficult routing problem. Additionally the prioritization of the external interface at external memory interface 220 is a difficult problem. Further, this known technique does not scale well with increasing numbers of data processing cores. External memory interface 220 requires a master port for each provided data processor core. Thus a different design must be provided for each supported number of data processor cores. Increasing the number of data processor cores causes the design of external memory interface 220 to be increasing complex.

Figure 3:
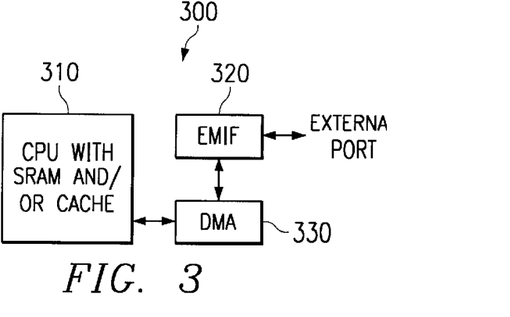
FIG. 3 illustrates the inventive technique for connecting a data processor core, a direct memory access unit and an external memory interface.

FIG. 3 illustrates the construction according to this invention of a data processing apparatus having a single data processor core. Data processing apparatus 300 includes a single data processor core 310 of the type previously described. Data processor core 310 is bidirectionally coupled to direct memory access unit 330 in the same manner as previously described. External memory interface 320 is not directly connected to data processor core 310. Instead, all coupling between data processor core 310 and external memory interface 320 is via direct memory access unit 330.

There are numerous advantages to the construction illustrated in FIG. 3. The largely redundant data busses from data processor core 110 to both external memory interface 120 and direct memory access 130 are reduced to a minimum. It might seem that this reduction in the number of busses would decrease the maximum rate that data could be moved. In reality either the external port of the data processing apparatus or the port of the data processor core will determine the maximum data transfer rate. Additional data bus capacity between these ports generally fails to contribute to data throughput. This reduction in the required data busses frees integrated circuit area that may be better used or permits construction of a smaller integrated circuit with the same functionality. Since total integrated circuit area is directly related to cost of production, this is advantageous. The reduced data bussing also simplifies the placement and routing constraints in construction of the integrated circuit.

It can be clearly seen the construction of external memory interface 320 is simpler than that of external memory interface 120. External memory interface 320 must serve only a single master device, direct memory access unit 330. This eliminates the need to prioritize external accesses at external memory interface 320. It might be said that this decrease in the complexity of external interface 320 is made at the expense of increasing the complexity of direct memory access unit 330. In fact these additional tasks add very little to the requirements of direct memory access unit 330. The typical direct memory access unit can be programmed to transfer a specified amount of data from a specified source location to a specified destination location. Direct memory reads and writes by data processor core 310 can be viewed by direct memory access unit 330 as merely data transfers of minimum length. Data transfers for cache service are similar. Each such data transfer is of the length of the corresponding cache line. It is a relatively simple matter to transform each such data transfer into a data transfer of the type serviced by a standard direct memory access unit. Direct memory access unit typically support plural in process data transfers through what is called DMA channels. The typical direct memory access unit thus already has the capacity to handle prioritization of plural data transfers. Each of these data transfer types may be given priority within a hierarchy for access to the plural channels of direct memory access unit 330. Accordingly, the reduction in the complexity of external memory interface 320 requires very little increase in complexity in direct memory access unit 330. Thus there is a net reduction in complexity employing this invention. This is achieved by reusing hardware already required of direct memory access unit 330 for the other data transfers, particularly cache service.

Figure 4:
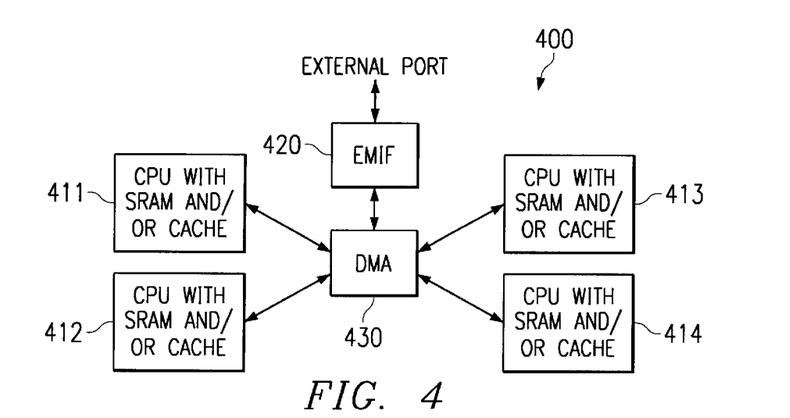
FIG. 4 illustrates the inventive technique for connecting plural data processor cores, a combined direct memory access unit and a combined external memory interface.

FIG. 4 illustrates the extension of this invention as illustrated in FIG. 3 to multiprocessing. Data processing apparatus 400 includes plural data processor cores 411, 412, 413 and 414. This number is just an example. Each data processor core 411, 412, 413 and 414 is connected to direct memory access unit 430 for direct memory access data transfer, data processor core data access and cache service. External memory interface 420 is connected only to direct memory access unit 430 in a manner similar to the connection of external memory interface 320 and direct memory access unit 330 illustrated in FIG. 3.

Comparison of FIGS. 2 and 4 shows the advantages of this invention. This invention eliminates a large number of redundant data paths otherwise required. In the multiprocessing embodiments of FIGS. 2 and 4 this reduction in and simplification of the data paths greatly eases the burden of placing circuits on the integrated circuit and routing their signals. As previously described, the transfer of functions from external memory interface 420 to direct memory access unit 430 results in a net savings of integrated circuit area. On an additional level, the construction of this invention greatly reduces the redesign needed to support data processing apparatuses with differing numbers of data processor cores. Data processor cores such as data processor cores 411, 412, 413 and 414 may be of a single design regardless of the number implemented. These data processor cores can be embodied in a hard macro, that is a design fixed in placement and routing within its boundaries. Similarly, external memory interface 440 may be of a single design regardless of the number of data processor cores. External memory interface 440 may also be embodied in a hard macro. Only direct memory access unit 430 need be particularized for differing numbers of data processor cores. Even in this case much redesign is not needed. Direct memory access units are inherently scalable by addition of more ports. Channels allow more port-to-port transfer to be simultaneously in progress. Adoption of a direct memory access unit of the type disclosed as a transfer controller in U.K. patent application no. 9909196.9 filed Apr. 16, 1999 and entitled TRANSFER CONTROLLER WITH HUB AND PORTS ARCHITECTURE, having a U.S. convention application now U.S. Pat. No. 6,496,740 is very advantageous in this regard. This transfer controller employs a hub which connects to ports having a fixed interior portion and a changeable exterior portion adapted to the application device attached. Using such a transfer controller would permit the use of a single design or a limited set of design variations across a large range of number of data processor cores. It is even possible for such a transfer controller to handle plural external memory interfaces or external ports, even of differing types.

Figure 5:
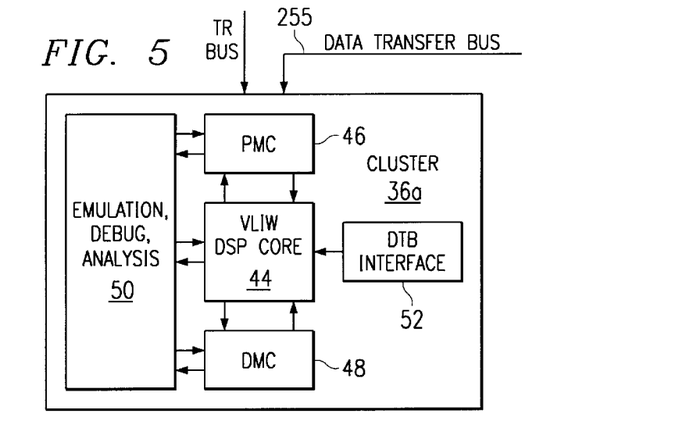
FIG. 5 illustrates a block diagram form an example of one of the multiple processors illustrated in FIG. 4.

FIG. 5 illustrates a block diagram of an example of a preferred processor and cache memory combination implementing the data processor cores 411, 412, 413 and 414 of FIG. 4. Each data processor core 411, 412, 413 and 414 preferably includes a digital signal processor core and corresponding instruction and data cache memory. Direct memory access unit 430 provides for all data communication among data processor cores 411, 412, 413 and 414, external input/output (I/O) devices and peripherals at the external port. Each data processor core 411, 412, 413 and 414 preferably comprises a very long instruction word (VLIW) digital signal processor core 44, program memory controller (PMC) 46, data memory controller (DMC) 48, an emulation, test, analysis and debug block 50, local memory and data transfer bus (DTB) interface 52. Data processor cores 411, 412, 413 and 414 and direct memory access unit 430 communicate over a bi-directional data bus or 2 unidirectional busses going opposite directions. Data processor cores 411, 412, 413 and 414 uses a transfer request bus to specify and request DMA transactions in direct memory access unit 430. A data transfer bus is used to load and store data from objects in the global memory map. While any given digital signal processor core 44 can access its own internal local memory within the cluster without permission from direct memory access unit 430, any access to global memory outside of its local memory requires a DMA directed data transfer, whether the access is to external memory or to another digital signal processor local memory. The overall architecture is scalable, allowing for the implementation of many internal memory nodes, although three is currently the preferred embodiment. It should be noted that architectural details, such as the number of digital signal processor cores, and their instruction set architectures are not essential to the invention. This microprocessor architecture is exemplary only, and the invention is applicable to many microprocessor architectures.

Figure 6:
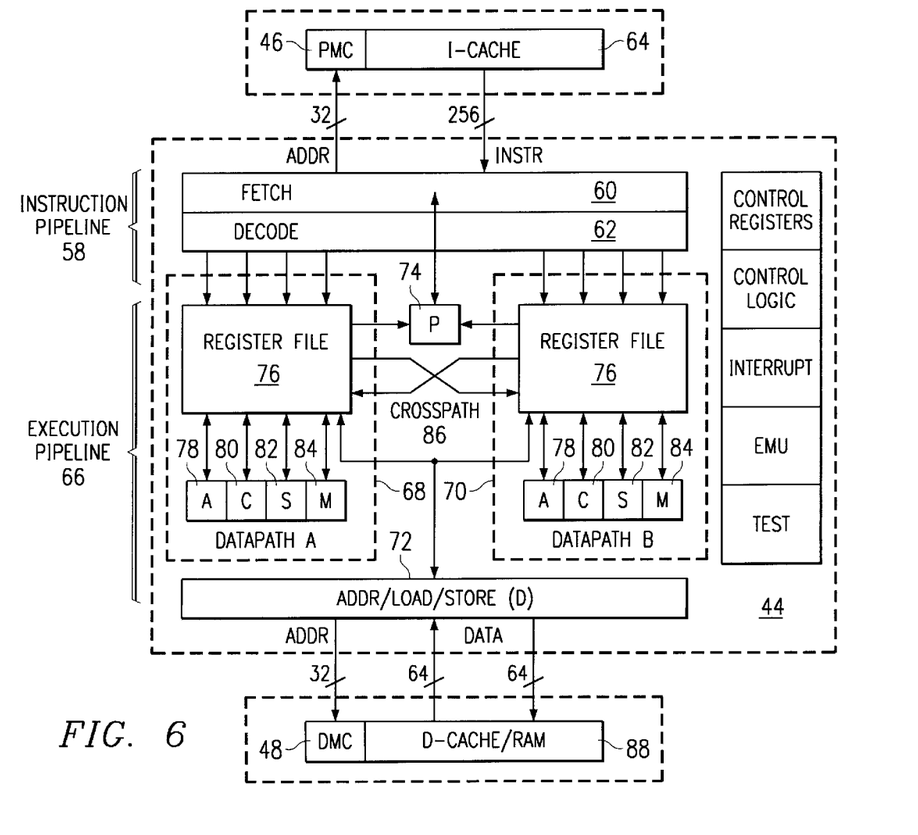
FIG. 6 illustrates further details of the very long instruction word digital signal processor core illustrated in FIG. 5.

FIG. 6 is a block diagram illustrating more detail of one example of a digital signal processor core 44 illustrated in FIG. 5. Digital signal processor core 44 is a 32-bit eight-way VLIW pipelined processor. The instruction set consists of fixed length 32-bit reduced instruction set computer (RISC) type instructions that are tuned for digital signal processing applications. Almost all instructions perform register-to-register operations and all memory accesses are performed using explicit load/store instructions. As shown in FIG. 6, instruction pipeline 58 consists of fetch stage 60 and decode stage 62. Fetch stage 60 retrieves program codes into the processor core from instruction cache 64 under control of program memory controller 46 in groups of eight instructions called a fetch packet. Decode stage 62 parses the fetch packet, determines parallelism and resource availability and constructs an execute packet of up to eight instructions. Each instruction in the execute packet is then translated into control signals to drive the appropriate units in execution pipeline 66. Execution pipeline 66 consists of two symmetrical datapaths, datapath A 68 and datapath B 70, a common 64-bit load/store unit group D-unit group 72, and a common branch unit group P-unit group 74. Each datapath contains 32-word register file (RF) 76, and four execution unit groups, A-unit group 78, C-unit group 80, S-unit group 82, and M-unit group 84. Overall there are ten separate unit groups in execution pipeline 66. Eight of these units may scheduled concurrently every cycle. Each functional unit group contains plural functional units, some of which are duplicated between unit groups. In total there are nine 32- bit adders, four 32-bit shifters, three boolean operators, and two 32 bit by 16 bit multipliers. The multipliers are each configurable into two 16 bit by 16 bit multipliers or into four 8 bit by 8 bit multipliers. The memory at data processor cores 411, 412, 413 and 414 is preferably partitioned between instruction cache memory 64 controlled via program memory controller 46 and data cache memory and random access memory 88 controlled via data memory controller 48. These memory partitions are employed by digital signal processor core 44 in a conventional manner.

Each digital signal processor core 44 may request DMA data transfers in is several ways. Digital signal processor core 44 may issue a DMA request to direct memory access unit 430 in response to an explicit data transfer instruction. The data transfer instruction must specify the data source, the data destination and the data amount. These specifications may be by immediate fields in the instructions or by parameters stored in registers or memory. It is preferable that each digital signal processor core 44 be capable of requesting any data transfer that can be serviced by direct memory access unit 430. Thus any digital signal processor core 44 may transfer data internally or externally and load or read any internal memory.

Each digital processor core 44 preferably also includes automatic mechanisms for generating requests for DMA data transfer for cache service. Thus an instruction cache miss preferably causes program memory controller 46 to generate a DMA data transfer request from another data source to fill a line of instruction cache 64 with data including program instructions stored at the address generating the cache miss. Similarly, a data cache miss on a data read preferably causes data memory controller 48 to generate a DMA data transfer request to retrieve data to fill a line in data cache/random access memory 88 with corresponding data. These instruction and data are stored in a higher level of memory. This higher level of memory may be an on-chip combined cache used by all digital signal processor cores 44 or it may be external to the multiprocessor integrated circuit 400. There are two alternatives for data cache misses on data writes. In a write through mode, a data write by digital processor core 44 that misses data cache/random access memory 88 causes data memory controller 48 to generate a DMA data transfer request to store the write data in the appropriate location in a higher level of memory. In a writeback mode, a data write by digital processor core 44 that misses data cache/random access memory 88 causes data memory controller 48 to generate a DMA data transfer request to recall corresponding data in the appropriate location from a higher level of memory for storage in data cache/random access memory 88. The write data is then written into data cache/random access memory 88 overwriting the corresponding data just recalled from the higher level of memory. This process is referred to as write allocation within the data cache.

Data memory controller 48 preferably also employs a DMA data transfer request to handle data writeback to a higher level memory upon cache eviction of a dirty entry. A dirty cache entry includes data that has been modified since it was recalled from a higher level of memory. This modified data corresponds to a later state of the program than the data stored in the higher level of memory. When such data must be replaced to make room for new cache data, referred to as cache eviction, this dirty data must be written back to the higher level of memory to maintain the proper program state. Direct memory access unit 430 is preferably employed for this writeback of evicted dirty cache entries.

Figure 7:
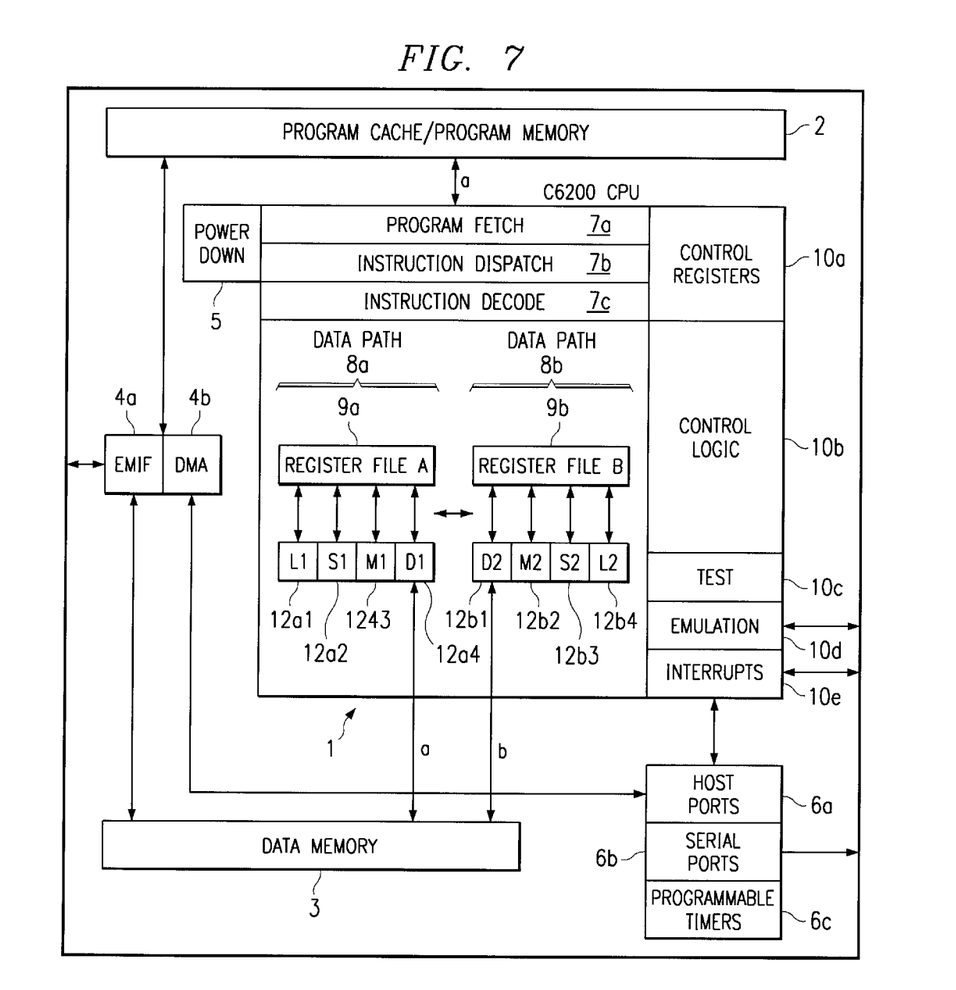
FIG. 7 illustrates further details of another very long instruction word digital signal processor core suitable for use in FIG. 5.

FIG. 7 is a block diagram illustrating more detail of another example of a digital signal processing core C/4 suitable for use as Core 44 in FIG. 5. The digital signal processor core of FIG. 7 is a 32-bit eight-way VLIW pipelined processor.

DETAILED DESCRIPTION

FIG. 7 shows a block diagram for a presently preferred digital signal processor (DSP). The DSP is based on a CPU 1, shown in the right center portion of FIG. 7. The DSP devices 11 come with program memory 2 which may be used as a program cache. The devices 11 may also have varying sizes and/or types of data memory 3. Peripherals 4 such as a direct memory access (DMA) controller 4a, power-down logic 5, an external memory interface (EMIF) 46 preferably come with the CPU, and peripherals 6 such as serial ports 6b and host ports 6a are optionally available.

The DSP has a 32-bit, byte addressable address space. Internal (on-chip) memory is organized in separate data 3 and program spaces 2. When off-chip memory is used, preferably these two spaces are unified into a single memory space via the external memory interface (EMIF) 46.

The DSP has two internal ports 3a,3b to access data memory 3, each with 32 bits of data and a 32-bit byte address reach. The DSP has a single port 2a to access program memory 2, with an instruction-fetch width of 256 bits and a 30-bit word (four bytes) address, equivalent to a 32-bit byte address.

The following peripheral modules may be supplied on the DSP: serial ports; timers; external memory interface (EMIF) that supports synchronous and asynchronous SRAM and synchronous DRAM; 2-channel auto-bootloading direct memory access (DMA) controller; host port; and power-down logic that can halt CPU activity, peripheral activity, and PLL activity to reduce power consumption.

Continuing to refer to FIG.7, the CPU contains: a program fetch unit 7a; an instruction dispatch unit 7b; an instruction decode unit 7c; two data paths 8a,8b, each with four functional units .L1, .S1, .M1 and .D1 or .L2, .S2, .M2 and .D2); 32 32-bit registers 9; control registers 10a; control logic 10b; and test 10c, emulation 10d, and interrupt 10elogic.

The program fetch 7a, instruction dispatch 7b, and instruction decode 7c units can deliver up to eight 32-bit instructions from the program memory 2 to the functional units every cycle. Processing occurs in each of the two data paths (8a and 8b). Each data path 8 has four functional units (.L, .S, .M, and .D) and a register file 9a or 9b containing 16 32-bit registers. Each functional unit is controlled by a 32-bit instruction. The data paths are covered in more detail later herein. A control register file 10a provides the means to configure and control various processor operations. How instructions are fetched, dispatched, decoded, and executed in the data path are described later herein with reference to pipeline operations.

Figure 8A:
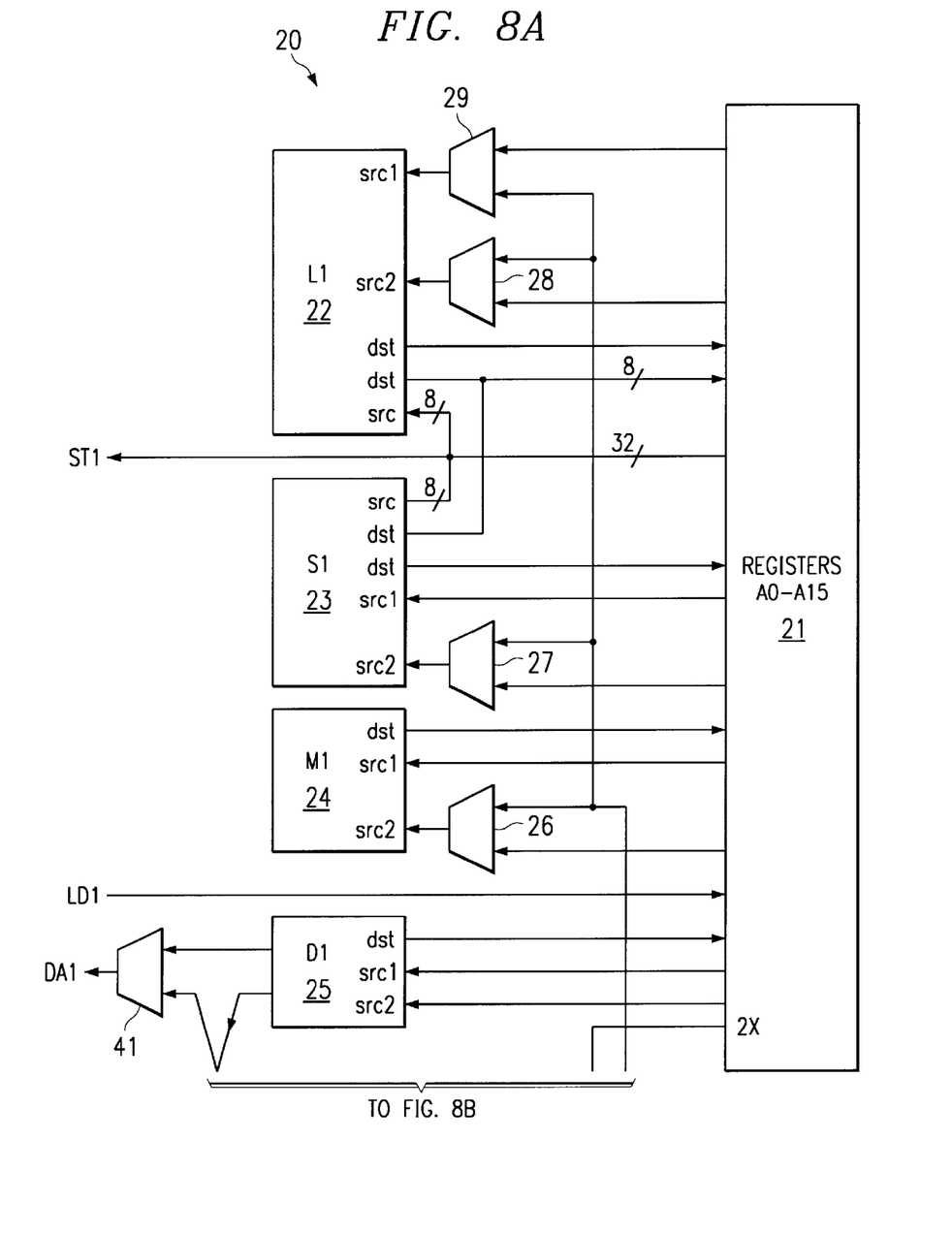
FIG. 8 illustrates additional details of the DSP of FIG. 7.
Figure 8B:
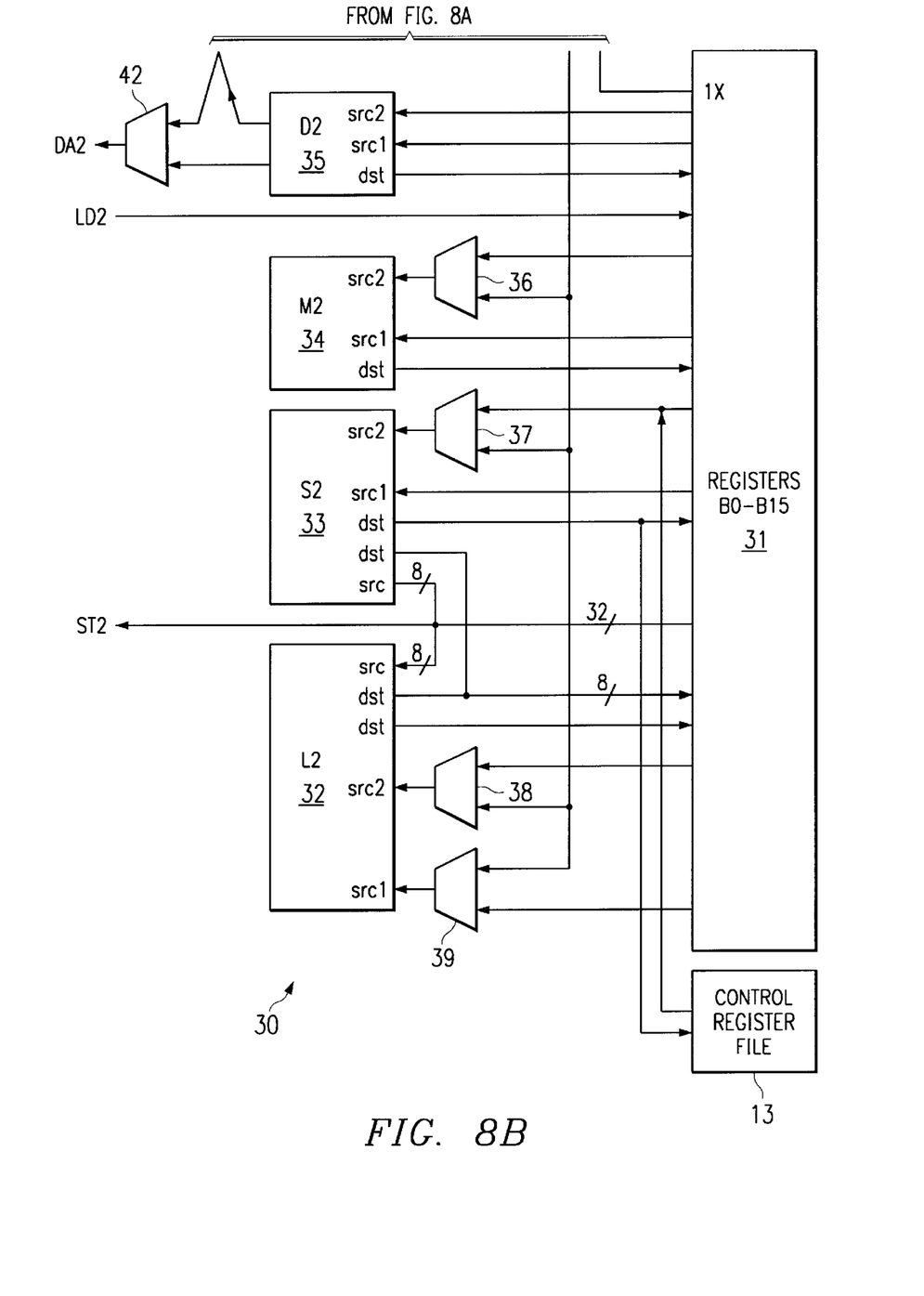

FIG. 8 shows the CPU 1 data paths, which consists of: two general purpose register files (9a and 9b); eight functional units (.L1, .L2, .S1, .S2, .M1, .M2,. D1, and .D2,); two load-from-memory paths (LD1 and LD2); two store-to-memory paths (ST1 and ST2); and two register file cross paths (1X and 2X).

There are two general purpose register files (9a and 9b) in the data paths. Each of these files contains 16 32-bit registers (labeled A0–A15 for file A and B0–B15 for file B).

The general purpose registers can be used for data, data address pointers, or as condition registers.

The eight functional units in the data paths can be divided into two groups of 4 (12a1–12a4 and 12b1–12b4), each of which is virtually identical for each register file. The functional units are described in Table 1 below.

TABLE 1

Functional Units and Descriptions

| Functional Unit | Description |
| --- | --- |
| .L Unit (.L1,.L2) | 32/40-bit arithmetic and compare operations<br>Left most 1, 0, bit counting for 32 bits<br>Normalization count for 32 and 40 bits<br>32 bit logical operations |
| .S Unit (.S1, .S2) | 32-bit arithmetic operations<br>32/40 bit shifts and 32-bit bit-field operations<br>32 bit logical operations,<br>Branching<br>Constant generation<br>Register transfers to/from the control register file |
| .M Unit (.M1, .M2) | 16 × 16 bit multiplies |
| .D Unit (.D1, .D2) | 32-bit add, subtract, linear and circular address calculation |

Most data lines in the CPU 1 support 32-bit operands, and some support long (40-bit) operands. Each functional unit has its own 32-bit write port into a general-purpose register file. All units ending in 1 (for example, L1) write to register file A and all units ending in 2 write to register file B. As depicted in FIG. 8, each functional unit has two 32-bit read ports for source operands src1 and src2. Four units (.L1, .L2, .S1, .S2) have an extra 8-bit wide port for 40-bit long writes as well as an 8-bit input for 40-bit long reads. Because each unit has its own 32-bit write port, all eight units can be used in parallel every cycle.

As depicted in FIG. 8, each general-purpose register file is connected to the opposite register file's functional units by the 1X and 2X paths. These paths allow the .S, .M, and, .L units from each side to access operands from either file.

Four units (.M1, .M2, .S1, .S2), have one 32-bit input mux selectable with either the same side register file (A for units ending in a 1 and B for units ending in a 2), or the opposite file via the cross paths (1X and 2X). The 32-bit inputs on the .L1 and .L2 units are both multiplexer ("mux") selectable via the cross paths.

There are two 32-bit paths for loading data from memory to the register file: one (LD1) for register file A, and one (LD2) for register file B. There are also two 32-bit paths, ST1 and ST2, for storing register values to memory from each register file. The store paths are shared with the .L and .S long read paths.

As depicted in FIG. 8, the data address paths (DA1 and DA2) coming out of the .D units allow data addresses generated from one register file to support loads and stores to memory from the other register file.

As depicted in FIG. 8, one unit (.S2) can read from and write to the control register file.

What is claimed is:

1. A data processing apparatus comprising:

a plurality of data processor cores, each having integral cache memory and local memory and a single data interchange port;

an external memory interface having an internal data interchange port and an external data interchange port adapted for connection to devices external to said data processing apparatus; and a direct memory access unit connected to said single data interchange port of each of said data processor cores and to said internal data interchange port of said external memory interface, said direct memory access unit transporting data according to commands received from said data processor cores, all data transported between a local memory of a data processor core and another data processor core taking place via said direct memory access unit, all data transported to or from devices external to said data processing unit taking place via said external memory interface, said direct memory access unit including a request queue controller receiving, prioritizing and dispatching data transfer requests, each data transfer request specifying a data source, a data destination and a data quantity to be transferred;

a data transfer hub connected to request queue controller effecting dispatched data transfer requests;

a plurality of ports, each port having an interior interface connected to said data transfer hub identically configured for each port and an exterior interface, one exterior interface connected to said single data interchange port of each of said data processor cores and one exterior interface connected to said internal data interchange port of said external memory interface, said interior interface and said exterior interface operatively connected for data transfer therebetween; and said data transfer hub controlling data transfer from a source port corresponding to said data source to a destination port corresponding to said data destination in a quantity corresponding to said data quantity to be transferred of a currently executing data transfer request.

2. The data processing apparatus of claim 1, wherein:

said plurality of data processor cores, said external memory interface and said direct memory access unit are embodied in a single integrated circuit, said single integrated circuit having said external interchange port of said external memory interface as its sole data port to devices external to said single integrated circuit.

3. A data processing apparatus comprising:

a plurality of data processor cores, each having integral cache memory and local memory and a single data interchange port;

an external memory interface having an internal data interchange port and an external data interchange port adapted for connection to devices external to said data processing apparatus; and a direct memory access unit connected to said single data interchange port of each of said data processor cores and to said internal data interchange port of said external memory interface, said direct memory access unit transporting data according to commands received from said data processor cores, all data transported between a local memory of a data processor core and another data processor core taking place via said direct memory access unit, all data transported to or from devices external to said data processing unit taking place via said external memory interface;

each of said data processor cores including a data processor and an instruction cache for temporarily storing program instructions controlling said data processor, said data processor generating a direct memory access request to said direct memory access unit for program cache fill from a system memory external to said data processing apparatus upon a read access miss to said instruction cache; and said direct memory access unit transferring data from memory external to said data processing apparatus via said external memory interface to said instruction cache of a data processor core generating a direct memory access request for program cache fill.

4. A data processing apparatus comprising:

a plurality of data processor cores, each having integral cache memory and local memory and a single data interchange port;

an external memory interface having an internal data interchange port and an external data interchange port adapted for connection to devices external to said data processing apparatus; and a direct memory access unit connected to said single data interchange port of each of said data processor cores and to said internal data interchange port of said external memory interface, said direct memory access unit transporting data according to commands received from said data processor cores, all data transported between a local memory of a data processor core and another data processor core taking place via said direct memory access unit, all data transported to or from devices external to said data processing unit taking place via said external memory interface;

each of said data processor cores including a data processor and a data cache for temporarily storing data employed by said data processor, said data processor generating a direct memory access request for data cache fill from a system memory external to said data processing apparatus upon a read access miss to said data cache;

said direct memory access unit transferring data from said system memory via said external memory interface to said data cache of a data processor core generating a data transfer request for data cache fill.

5. The data processing apparatus of claim 4, wherein:

said data processor of each of said data processor cores generating a direct memory access request for data writeback to a system memory external to said data processing system upon a write miss to said data cache; and said direct memory access unit transferring data from said data cache of a data processor generating a direct memory access request for data writeback to said system memory via said external memory interface.

6. The data processing apparatus of claim 4, wherein:

said data processor of each of said data processor cores generating a direct memory access request for write data allocation from a system memory external to said data processing apparatus to said data cache upon a write miss to said data cache; and said direct memory access unit transferring data from said system memory via said external memory interface to said data cache of a data processor generating a direct memory access request for write data allocation.

7. The data processing apparatus of claim 4, wherein:

said data processor of each of said data processor cores generating a direct memory access request for data writeback to a system memory external to said data processing apparatus upon eviction of dirty data from said data cache;

said direct memory access unit transferring data from said data cache of a data processor generating a direct memory access request for data writeback to said system memory via said external memory interface.

8. The data processing apparatus of claim 3, wherein:

said plurality of data processor cores, said external memory interface and said direct memory access unit are embodied in a single integrated circuit, said single integrated circuit having said external interchange port of said external memory interface as its sole data port to devices external to said single integrated circuit.

9. The data processing apparatus of claim 4, wherein:

said plurality of data processor cores, said external memory interface and said direct memory access unit are embodied in a single integrated circuit, said single integrated circuit having said external interchange port of said external memory interface as its sole data port to devices external to said single integrated circuit.

* * * * *